No. 770,725. PATENTED SEPT. 20, 1904.
A. F. MADDEN.
RUNNING GEAR.
APPLICATION FILED JAN. 12, 1904.
NO MODEL.
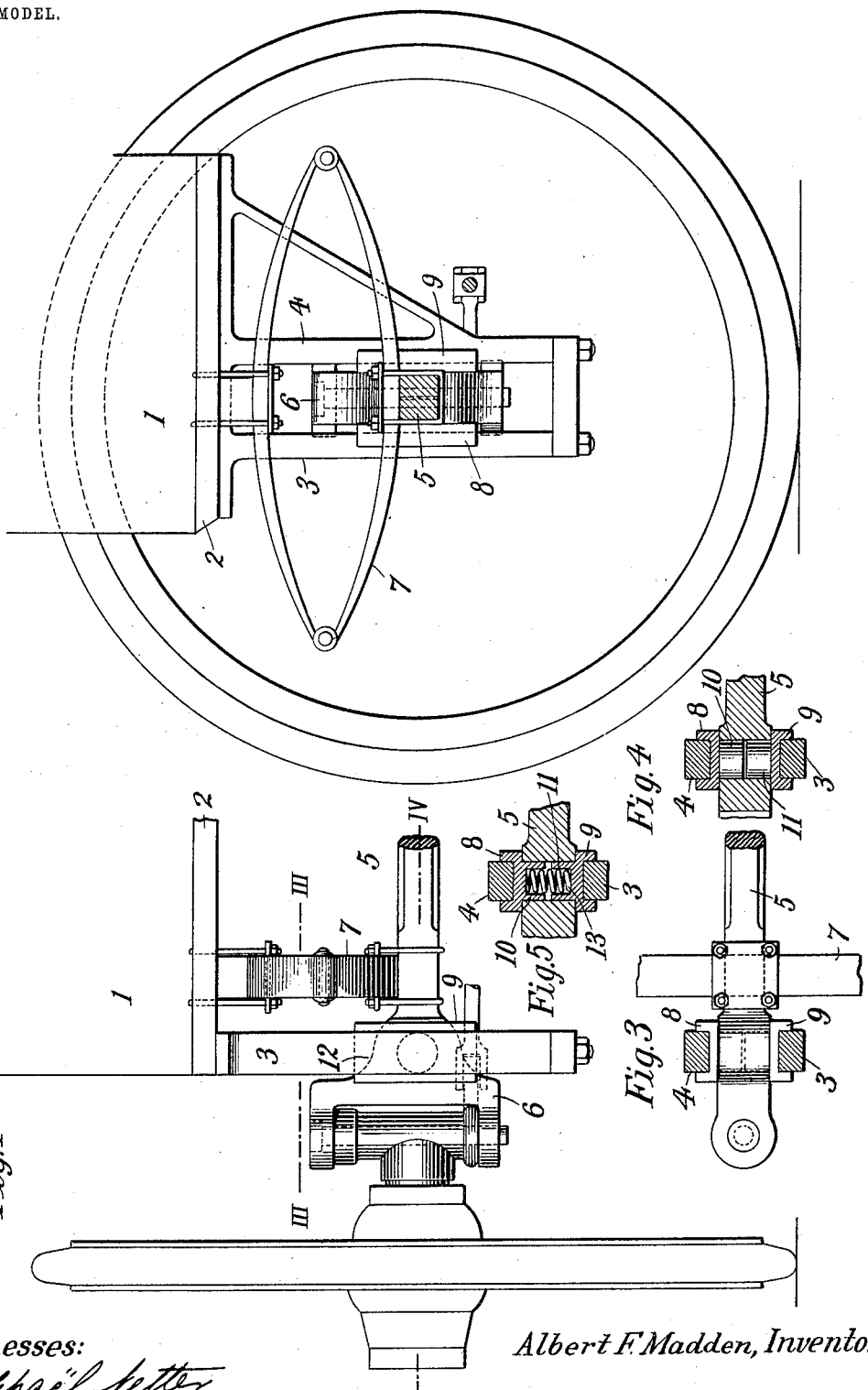
Witnesses: Albert F. Madden, Inventor
by Kerr, Page & Cooper Attys No. 770,725.

Patented September 20, 1904.

UNITED STATES PATENT OFFICE.

ALBERT F. MADDEN, OF NEWARK, NEW JERSEY, ASSIGNOR TO VEHICLE EQUIPMENT COMPANY, OF NEW YORK, N. Y., A CORPORATION OF NEW YORK.

RUNNING-GEAR.

SPECIFICATION forming part of Letters Patent No. 770,725, dated September 20, 1904.

Application filed January 12, 1904. Serial No. 188,682. (No model.)

*To all whom it may concern:*

Be it known that I, ALBERT F. MADDEN, a citizen of the United States, residing at Newark, county of Essex, and State of New Jersey, have invented certain new and useful Improvements in Running-Gears, of which the following is a specification, reference being had to the drawings accompanying and forming part of the same.

My invention relates to running-gears, particularly for "self-propelled" vehicles, though it will also be found of value for vehicles of other types.

The object of the invention is to provide a strong simple construction which will permit free vertical movement of the wheels and body relative to each other, but at the same time prevent, with as little friction and strain on the parts as possible, relative movement or displacement in any other direction. For this purpose I employ, in connection with the body of the vehicle, the axle, and the intermediate resilient devices, a pedestal or guide at each end of the axle to prevent longitudinal movement of the latter relative to the body and provide devices coöperating with the pedestals or guides to prevent lateral or transverse movement. I have devised a number of constructions for this purpose, one of which is illustrated in the accompanying drawings, in which—

Figure 1 is a view in elevation; Fig. 2, a side view; Fig. 3, a section on line III III of Fig. 1; Fig. 4, a detail sectional view on line IV IV of Fig. 1, and Fig. 5 a section corresponding to that of Fig. 4 of a modification.

The body of the vehicle is indicated by 1, preferably carrying a bolster, as 2. Connected therewith in any suitable manner is a pedestal, which preferably consists of a pair of parallel guides or rails 3 4, arranged perpendicularly to the body. Figs. 1 and 2 show only one pedestal; but it should be understood that the same is duplicated at the other side of the vehicle. Extending through the guides or rails of the pedestals is an axle 5, which may have at each end a bracket or equivalent device, as 6, carrying a horizontally-swinging spindle for the wheel to permit the vehicle to be steered in the well-known way. The body is yieldingly supported on the axle in any convenient and suitable manner—as, for example, by means of leaf-springs 7. It will now be seen that the body and axle may move toward or away from each other, but would be maintained in substantially the same transverse vertical plane by the guides or rails 3 4, against which the axle would strike.

Instead of making the axle bear directly upon the rails I interpose devices carried by the axle to take up the wear and provide the same with means to engage the rails to prevent displacement of the axle in line with its own axis. These are indicated by 8 9. They are provided with flanges, as shown, which engage the rails on opposite sides, and so hold the axle against displacement transverse with the vehicle. The shoes 8 9 might be rigidly secured; but in that case greater weight on one side of the vehicle than on the other or a greater unevenness on one side of the roadway than on the other tending to cause one end of the axle to rise or fall farther than the other end would have a tendency to turn the shoes or boxes at an angle to the rails. On account of the increased friction thus produced the parts would soon be ground out and become so weakened thereby as to be liable to give way under strain.

To permit a certain amount of motion of the ends of the axle independently of each other, I pivot the shoes thereto in any convenient way. For example, they may be provided with studs 10 11, which are journaled in the axle in any suitable way, as in the manner shown in Figs. 4 and 5. For this purpose the axle may be enlarged, as indicated at 12 in Fig. 1, thereby allowing a larger bearing to be used, and consequently a larger and stronger stud. The extent of independent movement of the axle ends which may take place without undue strain and friction on the rails depends, of course, upon the amount of clearance between the rails and the shoe-flanges, and since the independent motion would be on an arc of comparatively large radius this clearance may be sufficient to permit considerable movement of the ends relative to each other without making the engagement of the flanges and rails loose enough to be objectionable.

The friction on the faces of the shoes and rails will in time wear down the contiguous surfaces thereof, and to keep them always close together spring devices may be employed to press the shoes outward. A convenient construction for this purpose is shown in Fig. 5. Here the studs are bored out to hold a spring 13, as indicated, thereby keeping the shoes always in contact with the rails or close enough thereto to prevent rattling.

The construction herein exemplified accomplishes the objects of the invention in a satisfactory manner; but this construction is typical merely and by no means the only form in which the invention may be embodied, and I therefore do not consider myself limited to that shown.

What I claim is—

1. The combination with an axle and a vehicle-body yieldingly supported thereby, of pedestals carried by the body, constituting guides for the axle to prevent displacement thereof longitudinally of the vehicle, and devices pivoted in the axle, between the same and the adjacent guides, to swing in a plane transverse to the vehicle, and engaging the guides to prevent sidewise displacement of the axle, as set forth.

2. The combination with an axle and a vehicle-body yieldingly supported thereby, of pedestals carried by the body, constituting guides for the axle to prevent displacement thereof longitudinally of the vehicle, shoes pivoted in the axle between the same and the adjacent guides, to swing in a plane transverse to the vehicle, and having flanges engaging the pedestals to prevent sidewise displacement of the axle, as set forth.

3. The combination with an axle and a vehicle-body, yieldingly supported thereby, of pedestals carried by the body, having guides or rails on opposite sides of the axle to prevent displacement thereof longitudinally of the vehicle, shoes between the axle and the guides, having studs journaled in the axle, and means to prevent displacement of the axle transversely of the vehicle, as set forth.

4. The combination with an axle and a vehicle-body yieldingly supported thereby, of pedestals carried by the body, constituting guides or rails for the axle to prevent displacement thereof longitudinally of the vehicle, pivoted devices carried by the axle, means for holding said devices in yielding engagement with the pedestals, and means for preventing displacement of the axle relative to the vehicle, as set forth.

5. The combination with an axle and a vehicle-body yieldingly supported thereby of a pedestal carried by the body, having guides or rails on opposite sides of the axle, shoes intermediate the axle and the guides or rails having studs journaled in the axle, and means for holding the shoes in yielding engagement with the guides or rails, as set forth.

6. The combination with an axle and a vehicle-body yieldingly supported thereby, of a pedestal having guides or rails on opposite sides of the axle, shoes intermediate the axle and the guides or rails having studs journaled in the axle and flanges engaging the guides or rails, and a spring between the studs, as set forth.

7. The combination of an axle having an enlargement at each end thereof, a vehicle-body yieldingly supported by the axle, pedestals carried by the body, having guides or rails on opposite sides of the enlargements of the axle, shoes intermediate the axle and the guides or rails, having studs journaled in the enlargements and having flanges engaging the guides or rails, and a spring between the studs, substantially as and for the purposes set forth.

ALBERT F. MADDEN.

Witnesses:
M. LAWSON DYER,
S. S. DUNHAM.